(12) United States Patent
Breitwieser

(10) Patent No.: US 10,024,748 B2
(45) Date of Patent: Jul. 17, 2018

(54) DEVICE FOR ALIGNING A WORKPIECE IN A MASS-CENTRING DEVICE

(71) Applicant: Schenck RoTec GmbH, Darmstadt (DE)

(72) Inventor: Matthias Breitwieser, Gross-Umstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 180 days.

(21) Appl. No.: 15/202,660

(22) Filed: Jul. 6, 2016

(65) Prior Publication Data

US 2017/0023432 A1   Jan. 26, 2017

(30) Foreign Application Priority Data

Jul. 21, 2015   (DE) .................. 10 2015 111 789

(51) Int. Cl.
| | | |
|---|---|---|
| *G01M 1/16* | (2006.01) | |
| *B23B 31/36* | (2006.01) | |
| *G01M 1/04* | (2006.01) | |

(52) U.S. Cl.
CPC ............. *G01M 1/16* (2013.01); *B23B 31/36* (2013.01); *G01M 1/04* (2013.01); *B23B 2260/136* (2013.01)

(58) Field of Classification Search
CPC ........... G01M 1/04; G01M 1/10; G01M 1/14; G01M 1/20; B23B 31/19; B23B 31/36; B23B 2231/22

(Continued)

(56) References Cited

U.S. PATENT DOCUMENTS 4,031,760 A *  6/1977  Muller ............... G01M 1/04
                                                73/460
4,495,812 A *  1/1985  Gorris .............. G01M 1/04
                                                73/468

(Continued)

FOREIGN PATENT DOCUMENTS

DE      1 159 183 B    12/1963
DE      1 199 518 B     8/1965

(Continued)

OTHER PUBLICATIONS

United Kingdom Search Report of GB1612595.7, dated Jan. 10, 2017.

*Primary Examiner* — Peter Macchiarolo
*Assistant Examiner* — Alexander Mercado
(74) *Attorney, Agent, or Firm* — Collard & Roe, P.C.

(57) ABSTRACT

Disclosed is a device for aligning a workpiece in a mass-centering device, in which in an initial position an upper flange (1) and a lower flange (2) are arranged concentrically around an axis (3) of a balancing spindle of the mass-centering device, with the upper flange (1) comprising an interface (4) for clamping means to clamp the workpiece, and the lower flange (2) an interface (5) for fastening means to fasten the device to the balancing spindle. At least two spring elements (22, 23) reside between the upper and the lower flange (1, 2), such that in the initial position the upper flange (1) takes support axially and radially exclusively on the two spring elements (22, 23). In the initial position, the upper flange (1) is movable relative to the lower flange (2) into an eccentric position by a force acting in opposition to the spring elements (22, 23). A displacement device comprising a compression spring (9) and a piston (13) is arranged between the upper and the lower flange (1, 2) such that in a clamping position the piston (13) is movable, by the force of the compression spring (9), into engagement with a (Continued)

supporting element (20) of a fastening element (21) of the upper flange (1), so that the piston (13) enables the upper flange (1) to be clamped against the lower flange (2) and to be arrested in the eccentric position.

12 Claims, 1 Drawing Sheet

(58) Field of Classification Search
USPC ..... 279/2.1, 2.11, 2.12, 4.04, 5, 6, 132, 133, 279/141; 73/460
See application file for complete search history.

(56) References Cited

U.S. PATENT DOCUMENTS 6,612,791 B1* 9/2003 Haimer ................ B23B 29/046
279/2.03
2005/0046125 A1* 3/2005 Schuster ................... B23B 3/06
279/137
2008/0289416 A1* 11/2008 Thelen .................... F01D 5/027
73/471
2012/0128492 A1 5/2012 Liedel et al.
2013/0093147 A1* 4/2013 Doelp ..................... B23B 31/19
279/133
2015/0202694 A1* 7/2015 Buschbeck ........... B23B 31/265
279/2.03
2015/0361992 A1* 12/2015 Tezuka ................... G01M 1/04
415/213.1

FOREIGN PATENT DOCUMENTS

| DE | 10 2007 018 618 A1 | 10/2007 |
|----|--------------------|---------|
| EP | 0 281 286 A1 | 9/1988 |
| GB | 744 662 A | 2/1956 |
| GB | 1 013 266 A | 12/1965 |
| WO | 2006/050618 A1 | 5/2006 |

* cited by examiner

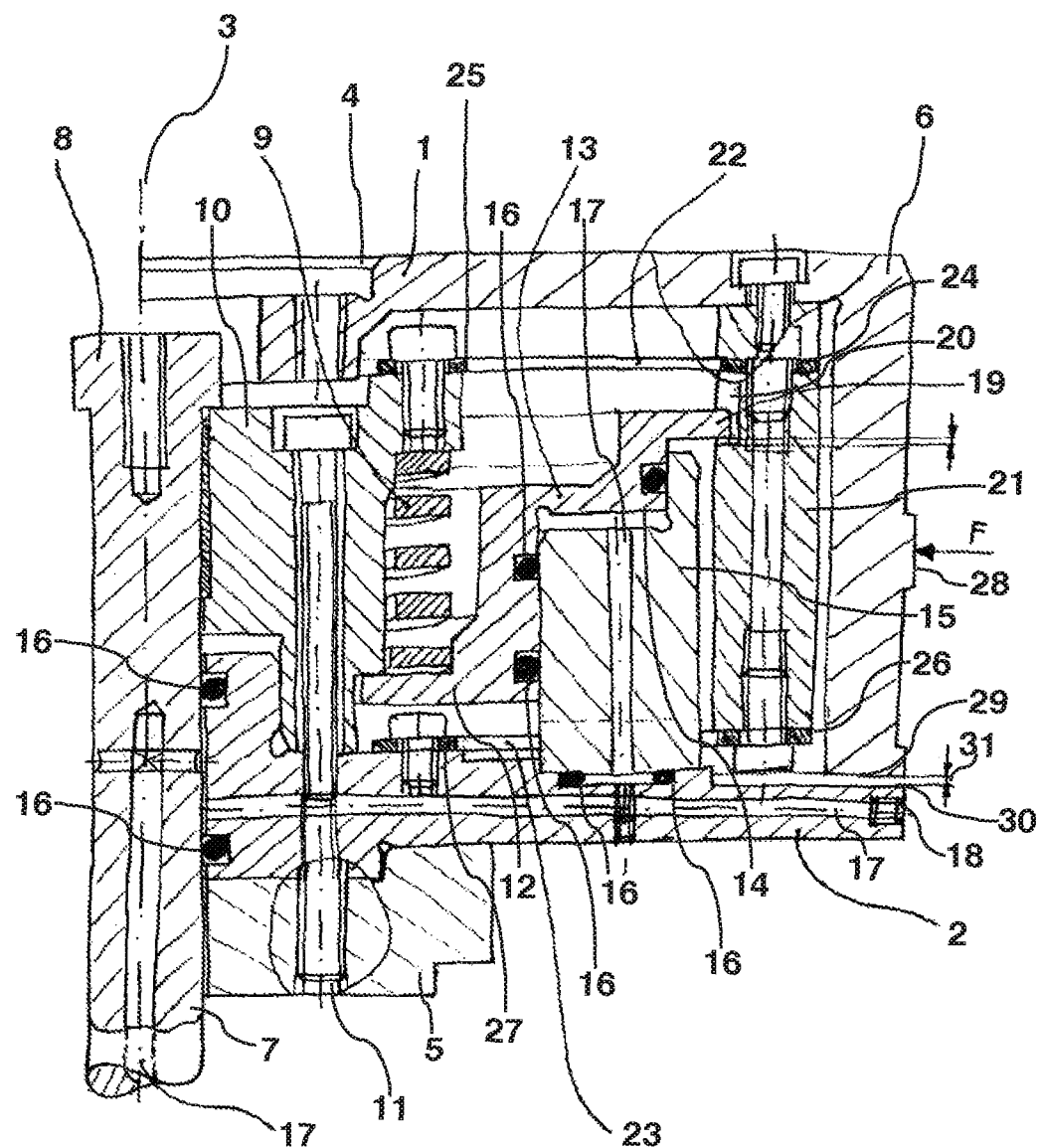

DEVICE FOR ALIGNING A WORKPIECE IN A MASS-CENTRING DEVICE

CROSS REFERENCE TO RELATED APPLICATIONS

Applicants claim priority under 35 U.S.C. § 119 of German Patent Application No. 10 2015 111 789.4 filed Jul. 21, 2015.

FIELD OF THE INVENTION

This invention relates to a device for aligning a workpiece in a mass-centring device, with an upper and a lower flange arranged in an initial position concentrically around an axis of a balancing spindle of the mass-centring device, with the upper flange comprising an interface for clamping means to clamp the workpiece, and the lower flange an interface for fastening means to fasten the device to the balancing spindle.

BACKGROUND OF THE INVENTION

Measurements of the position of the axis of inertia of a workpiece or machine part designed for rotation are taken in a process referred to as balancing or mass-centring. In this process, the workpiece is received in a machine in an initial position predetermined by its geometrical shape and rotated around the thus given axis of rotation. While the workpiece rotates, any existing unbalance is measured, and the position of the axis of inertia of the workpiece in relation to the given axis of rotation is determined. A further step comprises varying the bearing support of the workpiece such that the given axis of rotation and the axis of inertia coincide. In this position, locating bores or similar centring means are provided on the workpiece, which serve to locate the workpiece in the subsequent processing steps.

DE 10 2007 018 618 A1 discloses the structure of an exhaust gas turbo-charger constructed to include essentially a radial turbine having a turbine wheel and a compressor having a compressor wheel connected to the turbine wheel by a shaft in a manner preventing relative rotation. A problem presenting itself in the mass-centring of turbochargers is that the turbine wheel is frequently provided with a prior cast centre in consequence of which centring has to be performed in this centre. Performing centring with a drill frequently results in deviations from a desired position. Alternatively, centring may also be done by means of a grinding spindle.

SUMMARY OF THE INVENTION

It is an object of the present invention to provide a device for aligning a workpiece which enables the workpiece to be aligned in a mass-centring machine as accurately as possible.

According to the present invention, this object is accomplished by providing a device for aligning a workpiece in a mass-centring machine, with an upper and a lower flange arranged in an initial position concentrically around an axis of a balancing spindle of the mass-centring device, with the upper flange comprising an interface for clamping means to clamp the workpiece, and the lower flange an interface for fastening means to fasten the device to the balancing spindle, wherein at least two spring elements reside between the upper and the lower flange, such that in the initial position the upper flange takes support axially and radially exclusively on the two spring elements and that in the initial position the upper flange is movable relative to the lower flange into an eccentric position by a force acting in opposition to the spring elements, with a displacement device comprising a compression spring and a piston being arranged between the upper and the lower flange to enable a piston-controlled axial movement of the upper flange into a clamping position in which it is firmly clamped into abutting engagement with the lower flange. Advantageously, in the clamping position the force of the compression spring acts to enable the piston to move into engagement with a supporting element of a fastening element of the upper flange so that the piston enables the upper flange to be clamped against the lower flange and to be arrested in the eccentric position.

Owing to the embodiment of the device of the present invention, the upper flange is spring-loaded in the initial position, since it is supported exclusively on the spring elements in an axial and a radial direction. In the initial position, the upper flange is movable relative to the lower flange. This enables the upper flange receiving the workpiece to be aligned on completion of an unbalance measurement of the workpiece, such that a computed inertia axis making allowance for the unbalance of the workpiece lies coaxially with the axis and enables centring to be performed on the workpiece by means of a centring tool, such as, for example, a drill or a grinding spindle. Following displacement of the upper flange, the flange and hence the workpiece are moved into the clamping position in which movement of the upper flange is no longer possible. In the clamping position, the upper flange is held in frictional engagement with the lower flange.

In view of the upper flange being spring-loaded, it is possible to displace it substantially without friction, that is, without stick-slip effect. In this regard it is advantageous for the spring elements to be shaped in a meandering configuration because of their high tensile and compressive strength which ensures that the upper flange follows a force acting on it for displacement of the upper flange in the direction of both tension and compression.

It is proposed that the spring elements comprise one upper and one lower spring element and that the upper spring element be secured between the fastening element of the upper flange and a holding element of the lower flange, and the lower spring element between a free end of the fastening element and the lower flange. Owing to the arrangement of the spring elements, the upper flange is spring-loaded and movable relative to the lower flange in defined areas. On the other hand, the spring elements are configured such that even under maximum loads a sufficient minimum distance is maintained between the upper and the lower flange and that in the initial position it is not possible for the upper flange to make frictional engagement with the lower flange. Depending on the geometric configuration of the upper flange, it may be advantageous to use more than two spring elements. The spring rate and configuration of the spring elements may be adjusted in particular to the workpiece to be received.

Still further, it is proposed to provide for variability of the distance between the upper flange and the lower flange by means of the displacement device and to enable an abutment surface of the upper flange to make frictional engagement with a bearing surface of the lower flange. Advantageously, the spring elements are configured such that with the upper flange under maximum load a minimum gap is present between the abutment surface of the upper flange and the bearing surface of the lower flange. This ensures movability of the upper flange even under maximum loads. The displacement device may be arranged on the lower flange particularly by fastening means.

In a preferred embodiment, the lower flange includes at least one air channel and an air inlet valve connected therewith, with the air channel being arranged such that an injection of compressed air into the air inlet valve enables pressure to be applied to an effective surface of the piston and the piston to be moved against the force of the compression spring out of its engagement with the supporting element of the fastening element, thereby enabling the device to be moved from the clamping position into the initial position. Compressed air is injected through the air inlet valve into the air channel or the air channels. The air channel terminates on the effective surface of the piston, thereby applying pressure to the piston and tensioning the spring. The discharge of compressed air from the air channel, which causes the pressure applied to the piston to be reduced, relaxes the compression spring which urges the piston against the supporting element so that the upper flange is moved against the lower flange. In this regard it is advantageous for the spring rate of the compression spring to be greater than the spring rate of the spring elements. This enables the spring elements to be tensioned as soon as the compressed air escapes from the air channel and the compression spring acts on the piston.

In order to discharge the compressed air held in the air channel, the air channel includes in particular at least one air outlet orifice which is closed by a closure means. The closure means may be, for example, a plug or a controllable valve. Furthermore, the air channel of the device of the invention may be connected to a pneumatic system of the balancing machine to allow compressed air to be controllably introduced into, and discharged from, the air channel.

In order to shift the position of the upper flange in relation to the lower flange, another advantageous embodiment provides for movability of the upper flange in the initial position by means of a positioning device acting radially to the axis and centrally on the upper flange, such movement being in opposition to the force of the spring elements in a plane extending perpendicularly to the axis. Because the positioning device acts centrally between the upper and the lower spring element, tilting of the upper flange is prevented from occurring.

It is proposed configuring the upper flange in cup shape. Due to the preferred embodiment of the upper flange, a clearance space results between the upper and the lower flange which may be used for receiving the displacement device. Its high movability notwithstanding, the upper flange thus affords ease of construction for its movement into abutting engagement with the lower flange.

BRIEF DESCRIPTION OF THE DRAWING

The present invention will be explained in greater detail in the following with reference to an embodiment of the invention illustrated in the accompanying drawing.

DETAILED DESCRIPTION OF THE DRAWING

The drawing shows one side of an embodiment of a device for aligning a workpiece, in particular a turbine wheel of a turbocharger, in a mass-centring device. The device is essentially comprised of an upper flange 1 and a lower flange 2 which in an initial position are arranged concentrically around an axis 3 of a balancing spindle, not shown, of the mass-centring device. The upper flange 1 has an interface 4 for clamping means enabling clamping of a support member of a workpiece not shown, and the lower flange 2 has an interface 5 for fastening means to secure the device to the balancing spindle. The clamping means may be mounted on the upper flange 1 using suitable fastening means. For this purpose, the interface 4 for clamping means may include corresponding mounting means, such as bores.

The upper flange 1 has a cup-shaped configuration, with the sidewall 6 of the upper flange 1 extending parallel to the axis 3, thereby producing a clearance space having an opening in an axial direction within the upper flange 1, to be more precise, between the axis 3 and the sidewall 6. Adjoining the opening is the lower flange 2 which extends into the space formed by the upper flange 1. An axially movable pushrod 7 extending from the balancing spindle is guided on the lower flange 2 and serves as mechanical actuation of a release mechanism of the clamping means. Actuation of the pushrod 7 may be performed by a relaxation cylinder which is arranged concentrically with the spindle axis 3 and may be installed underneath the spindle. In addition, the pushrod 7 may have a thread at its free end 8 which may be used for demounting the pushrod 7.

Secured to the lower flange 2 by fastening means is a displacement device arranged in the space formed by the upper flange 1. The displacement device comprises a compression spring 9 aligned concentrically with the axis 3 of the balancing spindle and disposed around a central holding element 10 extending around the axis 3. The holding element 10 includes a through bore 11 and is fixedly secured to the lower flange 2 as, for example, by a screw. The compression spring 9 bears with one end against a shoulder of the holding element 10 and with its other end against an end 12 of a movable piston 13. The piston 13 extends concentrically around the holding element 10, with the first end 12 of the piston 13 combining with the holding element 10 to form a cavity in which the compression spring 9 it embedded.

The piston 13 has a stepped configuration, forming with a middle area an effective surface 14 spaced from a guide element 15 of the lower flange 2. The piston 13 is axially slidable relative to the guide element 15 to enable the distance between the effective surface 14 and the guide element 15 to be reduced or increased. The displaceability of the piston 13 in an axial direction is limited by a stop of the first end 12 of the piston 13 against a shoulder of the holding element 10 on the one side and by engagement of the effective surface 14 with the guide element 15 on the other side. With an area extending parallel to the axis 3, the piston 13 rests against the guide element 15, thus essentially preventing the piston 13 from being movable radially. In addition, this area includes two seals 16, for example, ring seals, which are received in corresponding grooves of the piston 13.

The guide element 15 also includes at least one air channel 17 or several air channels 17 the discharge areas of which open at right angles to the effective surface 14 of the piston 13. In a direction opposite the effective surface 14, the guide element 15 takes support upon two seals 16 which are received in a recess of the lower flange and prevent air from escaping from the air channel. The air channels 17 in the guide element 15 are pneumatically connected to air channels 17 which extend radially in the lower flange 2 and terminate on the pushrod 8. The air channels 17 have at least one air outlet orifice 18 closed by a closure means. The closure means may be constructed in the form of a plug or a valve, for example.

A second piston end 19 constructed, for example, as a follower means, is arranged in spaced relation to a supporting element 20 of a fastening element 21 of the upper flange 1 which is shaped in an annular configuration and extends parallel to the sidewall 6. The supporting element 20 may be configured as a shoulder or recess of the fastening element 21. The fastening element 21 is fixedly secured to the upper flange 1 by a fastening means and projects between the guide element 15 and the sidewall 6 into the space surrounded by the upper flange 1.

The fastening element 21 serves the added function of seating two spring elements, that is, one upper spring element 22 and one lower spring element 23. The upper spring element 22 has a first end 24 secured to the shoulder of the fastening element 21 above the supporting element 20, and a second end 25 to the holding element 10 above the compression spring 9. The lower spring element 23 has a first end 26 secured to the free end of the fastening element, and a second end 27 to the lower flange 2. Screws may be used for securing the spring elements 22, 23. While the spring elements 22, 23 are shaped in a meandering configuration, it will be understood that other spring-elastic elements or springs configured in a different way may also be used.

The device of the invention is firmly connected to the balancing spindle by fastening means adapted to be mounted on the interface 5 of the lower flange 2. The workpiece or a support member of the workpiece is clamped to the device using the interface 4 for clamping means arranged on the upper flange 1. The workpiece may be, for example, a turbine wheel of a turbocharger.

In an initial position, the upper flange 1 is aligned concentrically with the lower flange 2, bearing in an axial and radial direction exclusively against the two spring elements 22, 23, so that the upper flange 1 is spring-loaded in the initial position and movable into an eccentric position by a force acting in opposition to the spring forces of the spring elements 22, 23. In view of the elastic properties of the spring elements 22, 23, the upper flange returns to the concentric position as soon as the force acting on it has diminished. The force acting on the upper flange 1 is applied by a positioning device, not shown, which acts centrally on the upper flange 1 and radially relative to the axis 3. The positioning device acts to enable the upper flange 1 to move in opposition to the spring force of the spring elements 22, 23 in a plane perpendicular to the axis 3. The positioning device acts on an area of the upper flange 1 which, within the meaning of the invention, is designated as spring centre 28 and lies in a plane extending perpendicularly to the axis 3 and arranged centrally between the upper and the lower spring element 22, 23. The spring centre 28 is at equal distance from the upper spring element 22 and the lower spring element 23. This enables the upper flange 1 to be moved into an eccentric position without the risk of tilting.

In the initial position, the workpiece is fastened to the upper flange 1. Vibrations may occur as soon as the fixed coupling achieved in the clamping position between the lower flange 2 and the upper flange 1 is disengaged and the upper flange 1 rebounds from an eccentric position into the initial position. The necessary dying-out time may be determined empirically. Where appropriate, the amplitude of the free vibration may be measured with a displacement sensor. In the presence of a sufficiently small amplitude, the clamping of the upper flange 1 is released or actuated automatically. As soon as the vibrations of the spring elements 22, 23 have died down, the concentric alignment of the upper flange 1 relative to the lower flange 2 is arrested by evacuating compressed air held in the air channels 17. This may be accomplished, for example, by removing a closure means from an air outlet orifice 18 to allow the compressed air held in the air channels to escape. However, it is also possible for the compressed air to be introduced into, and discharged from, the device through at least one air channel 17 provided in the pushrod 8 and pneumatically connected to a pneumatic system of the balancing machine. The device may be vented through the air channel 17 in the pushrod 8 by a coupled valve, for example. Open- and closed-loop control of the pneumatic system and hence of the compressed air may be performed by the control unit of the balancing machine. The positioning device may equally be controlled by this unit.

Once the compressed air is discharged from the device and the spring force of the compression spring 9 is greater than the spring force of the spring elements 22, 23, the spring force of the compression spring 9 acts on the first end 12 of the piston 13, causing its effective surface 14 to approach the guide element 15, in addition to causing the second end 19 of the piston 13 or the follower means mounted on the second end 19 to engage the supporting element 20 of the fastening element 21 of the upper flange 1. The piston 13 urges the fastening element 21 and in consequence the upper flange 1 in an axial direction against the lower flange 2, thereby causing an abutment surface 29 on the free end of the upper flange 1, to be more precise, of the sidewall 6, to make frictional engagement with a bearing surface 30 of the lower flange 2 and the upper flange 1 to be moved from the initial position into a clamping position. The contact surface between the abutment surface 29 of the upper flange 1 and the bearing surface 30 of the lower flange 2 transmits a friction moment sufficiently large to prevent movement of the upper flange 1 relative to the lower flange 2 in the clamping position. In this position, a first unbalance measuring run takes place to determine the unbalance of the workpiece.

Using the measured unbalance it is possible to compute the eccentricity of the workpiece and hence to determine the position of the axis of inertia of the workpiece relative to the given axis of rotation. To be able to determine the axis of inertia of the workpiece relative to the measured eccentricity and achieve agreement between the given axis of rotation and the axis of inertia, it may become necessary to alter the alignment of the workpiece in the mass-centring device. To accomplish this, compressed air is injected through air channels 17 arranged in the pushrod 8 and connected to the pneumatic system of the balancing machine. The air channel or air channels 17 in the pushrod 8 are pneumatically connected to the air channels 17 in the lower flange 2, with seals 16 embedded in grooves of the lower flange 2 and resting against the pushrod 8 preventing the compressed air from escaping. The compressed air flows from the air channels 17 in the lower flange 2 into the air channels 17 of the guide element 15, thereby applying pressure to the effective surface 14 of the piston 13 and lifting the piston 13 clear of the supporting element 20 against the spring force of the compression spring 9 and moving the upper flange 1 from the clamping position into the initial position. The spring elements 22, 23 are designed such that under maximum load of the upper flange 1, that is, also when the workpiece is mounted on the upper flange 1, a minimum gap 31 is present between the abutment surface 29 of the upper flange 1 and the bearing surface 30 of the lower flange 2.

In the initial position, the upper flange 1 is spring-loaded and movable with the workpiece mounted thereon in the plane extending perpendicularly to the axis 3. The upper flange 1 is movable by means of the positioning device from its concentric position into an eccentric position. Upon displacement of the upper flange 1 by the positioning device exerting a force on the spring centre 28 in accordance with the measured eccentricity in order to arrest it in this position, the compressed air is evacuated from the air channels 17. Because of the absence of counterforce acting on the effective surface 14 of the piston 13 in opposition to the spring force of the compression spring 9, the piston 13 moves the upper flange 1 into the clamping position, fixing the eccentric position of the upper flange 1. The computed inertia axis which, as the case may be, may differ from the axis of rotation of the workpiece, may then be fixed by providing a central location. The central location may be provided by a drill or a grinding spindle. In cases where the central location is provided by an eccentrically arranged fixed grinding spindle with the workpiece rotating, the middle of the centre is always precisely concentric with the axis of rotation, and the roundness of the centre is optimal.

What is claimed is:

1. A device for aligning a workpiece in a mass-centering device, comprising:
    an upper and a lower flange (1, 2) arranged in an initial position concentrically around an axis (3) of a balancing spindle of the mass-centering device; the upper flange (1) comprising an interface (4) for clamping means to clamp the workpiece, and the lower flange (2) an interface (5) for fastening means to fasten the device to the balancing spindle;
    wherein at least two spring elements (22, 23) reside between the upper and the lower flange (1, 2), such that in the initial position the upper flange (1) takes support axially and radially exclusively on the two spring elements (22, 23) and that in the initial position the upper flange (1) is movable relative to the lower flange (2) into an eccentric position by a force acting in opposition to the spring elements (22, 23); and
    a displacement device comprising a compression spring (9) and a piston (13) being arranged between the upper and the lower flange (1, 2) to enable a piston (13)-controlled axial movement of the upper flange (1) into a clamping position in which the upper flange (1) is firmly clamped into abutting engagement with the lower flange (2).

2. The device according to claim 1, wherein in the clamping position the force of the compression spring (9) acts to enable the piston (13) to move into engagement with a supporting element (20) of a fastening element (21) of the upper flange (1) so that the piston (13) enables the upper flange (1) to be clamped against the lower flange (2) and to be arrested in the eccentric position.

3. The device according to claim 1, wherein the spring elements (22, 23) comprise one upper spring element (22) and one lower spring element (23) and that the upper spring element (22) is secured between a fastening element (21) of the upper flange (1) and a holding element (10) of the lower flange (2), and the lower spring element (23) between a free end of the fastening element (21) and the lower flange (2).

4. The device according to claim 1, wherein the distance between the upper flange (1) and the lower flange (2) is variable by means of the displacement device, and that an abutment surface (29) of the upper flange (1) is capable of making frictional engagement with a bearing surface (30) of the lower flange (2).

5. The device according to claim 2, wherein the lower flange (2) includes at least one air channel (17) and an air inlet valve connected therewith, with the air channel (17) being arranged such that an injection of compressed air into the air inlet valve enables pressure to be applied to an effective surface (14) of the piston (13) and the piston (13) to be moved against a force of the compression spring (9) out of its engagement with the supporting element (20) of the fastening element (21), thereby enabling the device to be moved from the clamping position into the initial position.

6. The device according to claim 5, wherein the air channel (17) includes at least one air outlet orifice (18) which is closed by a closure means.

7. The device according to claim 1, wherein in the initial position the upper flange (1) is movable by means of a positioning device acting radially to the axis (3) and centrally on the upper flange (1), such movement being in opposition to the force of the spring elements (22, 23) in a plane extending perpendicularly to the axis (3).

8. The device according to claim 1, wherein the upper flange (1) is configured in cup shape.

9. The device according to claim 1, wherein a spring force of the compression spring (9) is greater than a spring force of the spring elements (22, 23).

10. The device according to claim 1, wherein the spring elements (22, 23) are shaped in a meandering configuration.

11. The device according to claim 4, wherein the spring elements (22, 23) are configured such that under maximum load of the upper flange (1) a minimum gap (31) is present between the abutment surface (29) of the upper flange (1) and the bearing surface (30) of the lower flange (2).

12. The device according to claim 1, wherein the displacement device is arranged on the lower flange (2) by fastening means.

* * * * *